March 22, 1938.                H. C. CLAY                    2,112,141
              HYDRAULIC CONTROL FOR VARIABLE SPEED TRANSMISSIONS
                            Filed April 8, 1935
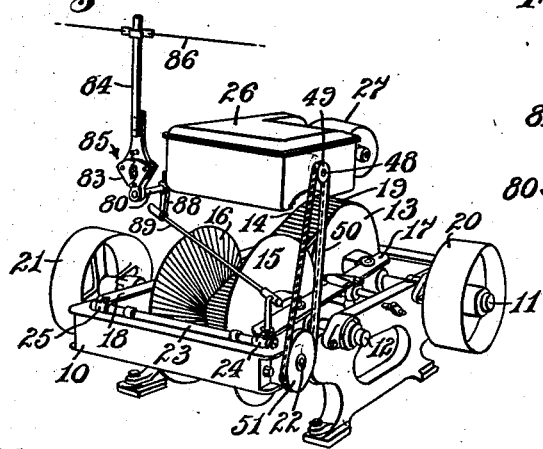
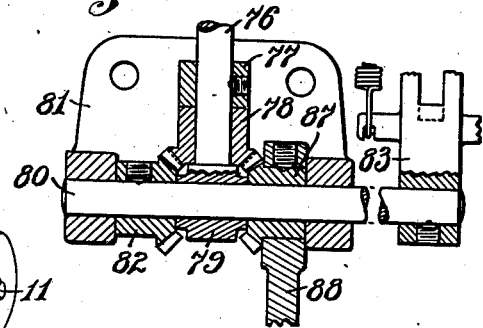
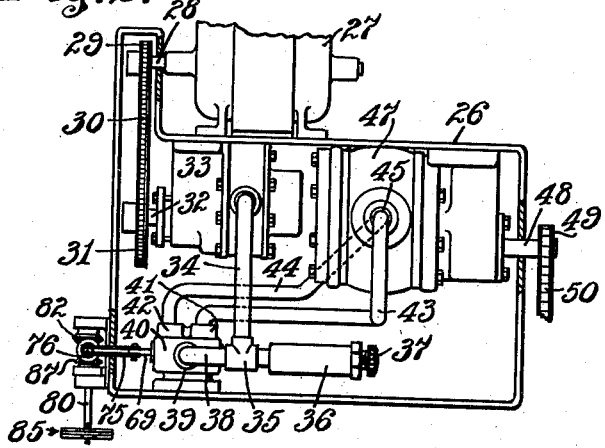
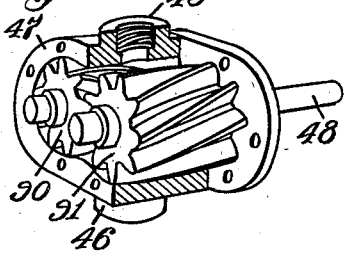
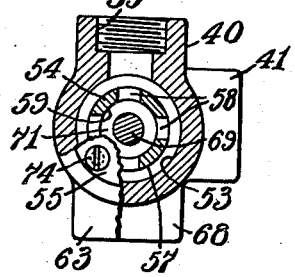
INVENTOR
*Harry C. Clay*,
BY
*Hood + Hahn*
ATTORNEYS Patented Mar. 22, 1938

2,112,141

UNITED STATES PATENT OFFICE 2,112,141

HYDRAULIC CONTROL FOR VARIABLE SPEED TRANSMISSIONS

Harry C. Clay, Columbus, Ind., assignor to Reeves Pulley Company, Columbus, Ind., a corporation of Indiana Application April 8, 1935, Serial No. 15,210

2 Claims. (Cl. 60—53)

The present application relates to hydraulic controls, primarily intended for controlling variable speed transmissions of the well-known "Reeves" type. A primary object of the invention is to provide means whereby the power delivered by a constantly operating motor may be utilized, as required, to adjust the ratio between input speed and output speed of such a transmission. A further object of the invention is to improve hydraulic controls, generally. A further object of the invention is to provide, in an organization of the character indicated, particularly effective means whereby the operation of the control is utilized to bring the control to rest after exactly the required degree of adjustment of the transmission elements has been effected. Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Fig. 1 is a more or less diagrammatic representation of the control of the present application applied to a Reeves variable speed transmission;

Fig. 2 is a plan view of the control, the cover for the housing having been removed, and parts having been broken away for clarity of illustration;

Fig. 3 is a perspective view of the hydraulic motor which forms an element of the invention, parts of the casing having been broken away;

Fig. 4 is a horizontal section, on an enlarged scale, through the control valve casing;

Fig. 5 is a vertical section through the control valve, parts of the valve bushing being shown in elevation;

Fig. 6 is a section taken substantially on the line 6—6 of Fig. 5, and looking in the direction of the arrows; and, Fig. 7 is an enlarged vertical sectional view of the compensating mechanism.

Referring more particularly to the drawing, it will be seen that in Fig. 1 I have shown the well-known Reeves type of variable speed transmission comprising a frame 10 and parallel shafts 11 and 12, either one of which may be the input shaft, the other being the output shaft. Two coned disks 13 and 14 are axially slidably splined on the shaft 11, said disks cooperating to form an expansible V-pulley. Similarly two coned disks 15 and 16 are axially slidably splined on shaft 12. A pair of levers 17 and 18, suitably pivoted intermediate their ends, are connected to thrust bearings associated with the respective disks 13, 14, 15 and 16, the arrangement being such that when corresponding ends of the two levers 17 and 18 are moved toward each other, the adjacent cones are likewise moved toward each other; the opposite ends of the lever, and the cones associated therewith, being correspondingly moved away from each other.

A belt 19 of V-cross-section provides the driving connection between the pulley formed by the disks 13 and 14 and by the pulley formed by the disks 15 and 16.

With the parts in the position illustrated and if it be assumed that shaft 11 is the input shaft, it will be obvious that the shaft 12 will be driven at a speed much greater than the speed of the shaft 11. If, however, the cones 13 and 14 are separated and the cones 15 and 16 are correspondingly moved toward each other, the difference in speed will be reduced; and it is a characteristic of this type of transmission that, in the extreme position of the parts opposite the position illustrated, there will be a speed reduction from the shaft 11 to the shaft 12 substantially equal to the speed increase effected when the parts are arranged in the manner illustrated in Fig. 1.

The shaft 11 carries a pulley 20, and the shaft 12 carries a pulley 21, whereby power may be applied to the transmission and withdrawn therefrom.

The reference numeral 22 indicates a shaft which, within the boundaries of the frame 10, is threaded, the parts of the thread adjacent the opposite ends of the shaft being of opposite pitch. A guide rod 23 has slidingly mounted thereon sleeves 24 and 25 which are carried on nuts (not shown) threadedly received on said portions of the thread of the shaft 22. It will be seen that a driving connection is provided between the sleeves 24 and 25 and the adjacent ends of the respective levers 17 and 18. Thus, rotation of the shaft 22 in one direction will move the disks 15 and 16 toward each other and will move the disks 13 and 14 away from each other; while rotation of the shaft 22 in the opposite direction will have an opposite effect upon the disks 13, 14, 15, and 16. The manner in which the shaft 22 causes motion of the discs 13, 14, 15 and 16 is very clearly illustrated in a large number of patents, among which are Patents Nos. 583,402; 603,067; 1,923,041; 2,035,402; and 2,084,723. In view of this fact, and in view of the further fact that the manner of operation of "Reeves" variable speed transmissions is extremely well known to the art, no more detailed disclosure of the operating mechanism of the transmission is believed to be necessary in the present application.

A control housing 26 is suitably mounted adjacent the transmission. To the outer wall of said housing is, in the preferred embodiment of my invention, secured a motor 27, the spindle 28 of which extends into the housing 26 and carries therein a sprocket 29. It will be understood, of course, that a pulley, driven from a line shaft, might be substituted for the motor 27, said pulley carrying a sprocket corresponding to the sprocket 29 within the housing 26.

Through a chain 30 the sprocket 29 drives a sprocket 31 on the shaft 32 of a pump 33, preferably of the gear type. The housing 26 forms a reservoir for oil, or other suitable fluid, into which projects an inlet pipe (not shown) leading from the inlet of the pump 33. A pipe 34 leads from the discharge port of the pump to a T 35, to one branch of which is connected a pressure-regulating relief valve 36 provided with a stem 37 for adjusting the pressure at which said valve will open to discharge oil into the reservoir. To the other branch of the T 35 is connected a pipe 38 leading to the inlet port 39 of a valve casing 40. Said valve casing 40 is provided with separate outlet ports 41 and 42, and a pipe 43 leads from the port 41 to one inlet port 45 of a reversible fluid motor 47, while a pipe 44 leads from outlet port 42 to the other inlet port 46 of said motor 47. The shaft 48 of motor 47 projects outwardly through the wall of the housing 26 and carries, outside said housing, a sprocket 49 which is connected, by a chain 50, to drive a sprocket 51 mounted on the shaft 22.

Obviously, operation of the motor 47 in one direction will drive the shaft 22 in a direction such as to move the disks 15 and 16 toward each other; and operation of the motor 47 in the opposite direction will drive the shaft 22 to move the disks 15 and 16 away from each other.

In Figs. 4, 5, and 6, the construction of the valve casing 40 and its contained parts are illustrated in detail. Said casing is interiorly formed with a straight-through bore 53 in which is press-fitted a bushing 54. Two washers 55 and 56 are suitably secured to the bushing 54 by means of screws 74, or other equivalent fastening means, and act to limit the stroke of the valve member 69 to about two-thirds the width of the ports 60 and 65.

Adjacent to its longitudinal center, the bushing 54 is provided with an external groove 57 from the bottom of which a plurality of ports 58 open into the interior bore of said bushing. Said groove 57 registers with the inlet port 39 of the valve casing 40, whereby the interior of the bushing 54 is placed in communication with said port. A second groove 59 is formed in the external surface of said bushing 54, said groove registering with the port 41 of the valve casing 40; and a plurality of ports 60 open from said groove 59 into the bore of the bushing 54, thereby placing said bore in communication with the port 41. At a point between said groove 59 and the adjacent end of the casing 40, said casing is formed with an internal groove 61, with which register a plurality of ports 62 opening into the bore of the bushing 54; and said groove 61 registers with an exhaust port 63 formed in the casing 40 and opening into the reservoir of the housing 26.

A third external groove 64 is formed in the bushing 54 and registers with the outlet port 42 of the casing 40. A plurality of ports 65 connect the groove 64 with the interior of the bushing 54. Between the groove 64 and the adjacent end of the casing 40, said casing is formed with an internal groove 66 with which register a plurality of ports 67 opening into the bore of the bushing 54; and said groove 66 registers also with a second exhaust port 68 in the casing 40 opening into the reservoir of the housing 26.

Reciprocably mounted in the bore of the bushing 54 is a valve member 69 of the piston type provided with a plurality of heads 70, 71, 72, and 73. As is clearly shown, one end of the valve member 69 projects from the casing 40.

A pair of links 75 connect said valve 69 with an arm 76 which carries a collar 77 operating to hold in place on said arm a beveled gear 78 which is free to rotate on said arm 76 but is held against reciprocation thereon. At its base, said arm 76 is provided with a hub 79 journaled on a rock shaft 80 which is suitably supported in bearings provided on a plate 81 which is secured to the housing 26.

Secured to the rock shaft 80 is a beveled pinion 82 meshing with the gear 78. Journaled on the rock shaft 80 is a second beveled pinion 87 meshing also with the gear 78 at a point diametrically opposed to the point of engagement between the gear 78 and the pinion 82. An arm 88 is secured to the pinion 87.

The rock shaft 80 carries also a lever 83 having an extension 84 secured thereto through a strain-relieving connection indicated generally at 85. Said connection 85 is of known construction and forms no part of my present invention; and is, therefore, not described in detail. If desired, a cable 86 may be attached to the extension 84, whereby said extension may be operated automatically from a driven machine, or may be operated from a point of remote control. To the arm 88 is secured a rod 89 connected, at its opposite end, to the sleeve 24.

In practice, the transmission indicated generally at 10 is used to transmit power from any suitable power source to a driven machine, and is capable of manipulation to vary the speed of the driven machine though the source of power operates at constant speed. If it be assumed that power is being supplied to the shaft 11 and is being taken off to the driven machine from the pulley 21, and if it be assumed that the motor 27 is running and that the valve member 69 is in the position illustrated in Figs. 4 and 5, it will be seen that power will be transmitted, with a certain speed increase, at constant speed so long as the parts remain in such positions. Since the motor 27 is operating, the pump 33 is operating to force oil from the reservoir in the housing 26 through the pipe 34 to the T 35. With the valve 69 in the position illustrated, the liquid under pressure can only flow through the ports 39 and 58 into that portion of the bore of the bushing 54 embraced between the valve heads 71 and 72. Pressure, therefore, builds up between the pump and the valve casing 40 until the valve 36 will open to discharge the supplied oil back into the reservoir.

If, now, the extension 84 is moved slightly to the left as viewed in Fig. 1, the rock shaft 80 will be rotated in a counter-clockwise direction Since the pinion 87 is held against rotation by the arm 88 and the rod 89 attached to the sleeve 24, such movement of the shaft 80 will be transmitted through the pinion 82 to the gear 78 to move said gear 78 and arm 76 in a counter-clockwise direction about the axis of the shaft 80. There will also be a slight rotation of the gear 78 about its own axis, and it is for that reason that said gear is journaled on the arm 76 instead of being rigidly secured thereto.

Such movement of the arm 76 will shift the valve member 69 toward the left as viewed in Figs. 4 and 5, thereby placing that portion of the interior of the bushing 54 embraced between the heads 71 and 72 in communication with the ports 65; and placing that portion of the interior of the bushing 54 embraced between the heads 72 and 73 in communication with the ports 60. Liquid will now flow through the pipe 34, T 35, pipe 38, port 39, groove 57, ports 58, bushing 54, ports 65, groove 64, port 42, and pipe 44 to the inlet 46 of the motor 47. As the liquid flows past the blades 90 and 91 of said motor, it will cause clockwise rotation of the shaft 48 as viewed in Fig. 1; and such rotation will be transmitted through the chain 50 to the shaft 22. From the motor 47, the liquid will flow through the port 45, pipe 43, port 41, groove 59, ports 60, bushing 54, ports 62, groove 61, and port 63, back into the reservoir in the housing chamber 26.

Clockwise rotation of the shaft 22 will be transmitted through the sleeves 24 and 25 to move the disks 15 and 16 toward each other and to move the disks 13 and 14 away from each other to reduce the output speed of the transmission. Such movement of the sleeve 24 carries with it, of course, the rod 89 to cause clockwise movement of the arm 88 and the pinion 87. Since, now, the lever 83, rock shaft 80, and pinion 82 are held against rotation, such clockwise rotation of the pinion 87 will be transmitted to the arm 76 to reverse the movement of said arm caused initially by the movement of the lever 83, thereby moving the valve 69 toward neutral position. Operation of the motor 47 will be continued until, and only until, the resultant adjustment of the transmission members has continued far enough to return the arm 76 and valve 69 to neutral position. It will be noted that such return movement of the valve 69 to neutral position does not affect the lever 83 and extension 84; and that, therefore, the position of the said extension 84 may well constitute an indicator of the speed ratio of the transmission, at any given moment.

I claim as my invention:

1. For use with a variable speed transmission including an element movable to vary the ratio between the input speed and the output speed thereof, a control mechanism comprising a reversible fluid motor having two fluid inlets, a source of fluid under pressure, a conduit connecting said source to supply fluid to one of said motor inlets to drive said motor in one direction, a conduit connecting said source to supply fluid under pressure to the other of said motor inlets to drive said motor in the opposite direction, valve means connected in said conduits for controlling flow therethrough, and comprising a valve member shiftable in one direction from neutral position to direct fluid flow to one of said motor inlets and shiftable in the opposite direction from neutral position to direct fluid flow to the other of said motor inlets, means connecting said motor to drive the movable element of the transmission in opposite directions, a rock shaft, a bevelled pinion fast on said rock shaft, an arm angularly related to said rock shaft, oscillable about the axis of said rock shaft, and operatively connected to said valve, a bevelled gear loosely mounted on said arm and meshing with said bevelled pinion, a second bevelled pinion loosely mounted on said rock shaft and meshing with said bevelled gear, and means operatively connecting said element-driving means to rotate said second bevelled pinion.

2. In a device of the class described, a reversible fluid motor having two fluid inlets, a source of fluid under pressure, conduit means leading from said source to said respective inlets, valve means connected in said conduit means for controlling flow therethrough, and comprising a member shiftable in one direction from a neutral position to direct fluid flow to one of said motor inlets to drive said motor in one direction and shiftable in another direction from a neutral position to direct fluid flow to the other of said motor inlets to drive said motor in the opposite direction, a shaft, two pinions mounted on said shaft, one of said pinions being fast on said shaft and the other being rotatable with respect thereto, an arm oscillably mounted on said shaft and operatively connected to said shiftable member, a gear rotatably mounted on said arm and meshing with said pinions, means for turning said shaft, and means operatively connecting said motor to turn said loosely-mounted pinion.

HARRY C. CLAY.